US012573879B2

(12) United States Patent
Hansen et al.

(10) Patent No.:  US 12,573,879 B2
(45) Date of Patent:      Mar. 10, 2026

(54) SYSTEMS AND METHODS FOR IMPROVING THERMAL PERFORMANCE OF WIRELESS POWER TRANSFER SYSTEMS

(71) Applicant: TC1 LLC, St. Paul, MN (US)

(72) Inventors: John Freddy Hansen, Livermore, CA (US); Rachel Keen, Medford, MA (US); Alexander Baval, St. Paul, MN (US); Daniel I. Harjes, Carlisle, MN (US); Jeffrey Iudice, Lowell, MN (US); Russell Eugene Anderson, Hopkins, MN (US)

(73) Assignee: TC1 LLC, St. Paul, MN (US)

( * ) Notice: Subject to any disclaimer, the term of this patent is extended or adjusted under 35 U.S.C. 154(b) by 0 days.

(21) Appl. No.: 18/718,322

(22) PCT Filed: Dec. 13, 2022

(86) PCT No.: PCT/US2022/081431
§ 371 (c)(1),
(2) Date: Jun. 10, 2024

(87) PCT Pub. No.: WO2023/122449
PCT Pub. Date: Jun. 29, 2023

(65) Prior Publication Data
US 2025/0055316 A1      Feb. 13, 2025

Related U.S. Application Data

(60) Provisional application No. 63/291,695, filed on Dec. 20, 2021.

(51) Int. Cl.
*H02J 50/00* (2016.01)
*H01F 27/22* (2006.01)
(Continued)

(52) U.S. Cl.
CPC ............ *H02J 50/005* (2020.01); *H01F 27/22* (2013.01); *H02J 50/12* (2016.02); *H02J 50/70* (2016.02); *H02J 2310/23* (2020.01)

(58) Field of Classification Search
CPC .......... H02J 50/005; H02J 50/12; H02J 50/70; H02J 2310/23; H01F 27/22; H01F 27/025;
(Continued)

(56) References Cited

U.S. PATENT DOCUMENTS

| | | | | |
|---|---|---|---|---|
| 11,351,388 B1 * | 6/2022 | O'Driscoll | ........... | A61N 1/0556 |
| 11,682,924 B2 * | 6/2023 | Hansen | ............... | A61M 60/178 |
| | | | | 307/149 |

(Continued)

FOREIGN PATENT DOCUMENTS

| | | | | | |
|---|---|---|---|---|---|
| CA | | 2950281 C | * | 1/2019 | .............. B60L 53/12 |
| CN | | 113852144 A | * | 12/2021 | .............. H02J 50/10 |

OTHER PUBLICATIONS

PCT International Search Report and Written Opinion, Application No. PCT/US2022/081431, dated Jun. 2, 2023, 20 pages.

*Primary Examiner* — Rexford N Barnie
*Assistant Examiner* — Michael J Warmflash
(74) *Attorney, Agent, or Firm* — Armstrong Teasdale LLP

(57) ABSTRACT

A transmit resonator for use in a wireless power transfer system is provided. The transmit resonator includes a core defining an annular groove, a coil element disposed within the annular groove, and a housing surrounding the core and the coil element. The housing includes a casing. and a metal plate, wherein the metal plate is positioned on a side of the transmit resonator that is opposite a receive resonator during operation of the wireless power transfer system, and wherein
(Continued)

the metal plate facilitates reducing far-field electromagnetic emissions and improving cooling of the wireless power transfer system.

18 Claims, 7 Drawing Sheets

(51) Int. Cl.
  *H02J 50/12*                (2016.01)
  *H02J 50/70*                (2016.01)
(58) Field of Classification Search
  CPC ...... H01F 27/363; H01F 27/366; H01F 38/14;
          A61M 2205/36; A61M 2205/3606; A61M
          2205/8243; A61M 60/216; A61M 60/873;
                      A61M 60/178; H04B 5/24
  See application file for complete search history.

(56)                 References Cited

U.S. PATENT DOCUMENTS

2009/0048540 A1*   2/2009  Otto ...................... A61B 5/1118
                                                    600/595
2012/0032522 A1*   2/2012  Schatz ................. H02J 7/0042
                                                    307/104

2012/0245649 A1*   9/2012  Bohori ................ H02J 7/00034
                                                    607/57
2015/0290373 A1*  10/2015  Rudser ................ A61M 60/538
                                                    623/3.27
2017/0259677 A1*   9/2017  Stewing ................ B60L 53/302
2018/0091183 A1*   3/2018  Basak .................. H04B 1/3888
2021/0283391 A1*   9/2021  Hansen .................... H02J 50/12
2021/0343470 A1*  11/2021  Los ......................... H02J 50/12
2021/0346682 A1*  11/2021  Peichel ................... H02J 50/10
2021/0384771 A1*  12/2021  Hansen ................... H01F 27/40
2021/0386990 A1*  12/2021  Stotz ................... A61M 60/873
2025/0010059 A1*   1/2025  Hansen .............. A61M 60/216
2025/0023388 A1*   1/2025  Hansen ................. H01F 41/00
2025/0023390 A1*   1/2025  Hansen ................... H04B 5/24

* cited by examiner

SYSTEMS AND METHODS FOR IMPROVING THERMAL PERFORMANCE OF WIRELESS POWER TRANSFER SYSTEMS

CROSS-REFERENCE TO RELATED APPLICATIONS

This application is a National Stage Entry filed under 35 U.S.C. § 371 of International Application No. PCT/US2022/081431, filed on Dec. 13, 2022which claims the benefit of, and priority to, U.S. Provisional Patent Application Ser. No. 63/291,695, filed on Dec. 20, 2021, the entire content of each of which is incorporated by reference herein.

BACKGROUND OF THE DISCLOSURE a. Field of the Disclosure

The present disclosure relates generally to wireless power transfer systems, and more specifically, relates to improving thermal performance of wireless power transfer systems.

b. Background

Ventricular assist devices, known as VADs, are implantable blood pumps used for both short-term (i.e., days or months) and long-term (i.e., years or a lifetime) applications where a patient's heart is incapable of providing adequate circulation, commonly referred to as heart failure or congestive heart failure. A patient suffering from heart failure may use a VAD while awaiting a heart transplant or as a long term destination therapy. In another example, a patient may use a VAD while recovering from heart surgery. Thus, a VAD can supplement a weak heart (i.e., partial support) or can effectively replace the natural heart's function.

A wireless power transfer system may be used to supply power to the VAD. The wireless power transfer system generally includes an external transmit resonator and an implantable receive resonator configured to be implanted inside a patient's body. This power transfer system may be referred to as a transcutaneous energy transfer system (TETS).

In general, it is desirable to reduce far-field electromagnetic (EM) emissions from a TETS (e.g., to reduce EM interference with other devices). For example, TETS should at least comply with various standards (e.g., the CISPR 11 Group 2 Class B limit). The transmit resonator is generally the largest source of far field EM emissions. Further, it is desirable to reduce the temperature of transmit and receive resonators. Accordingly, it would be advantageous to reduce EM emissions by the transmit resonator, and also to improve cooling of the transmit resonator.

SUMMARY OF THE DISCLOSURE

In one aspect, a transmit resonator for use in a wireless power transfer system is provided. The transmit resonator includes a core defining an annular groove, a coil element disposed within the annular groove, and a housing surrounding the core and the coil element, the housing including a casing. and a metal plate, wherein the metal plate is positioned on a side of the transmit resonator that is opposite a receive resonator during operation of the wireless power transfer system, and wherein the metal plate facilitates reducing far-field electromagnetic emissions and improving cooling of the wireless power transfer system.

In another aspect, a wireless power transfer system is provided. The wireless power transfer system includes a receive resonator and a transmit resonator including a core defining an annular groove, a coil element disposed within the annular groove, and a housing surrounding the core and the coil element, the housing including a casing, and a metal plate, wherein the metal plate is positioned on a side of the transmit resonator that is opposite a receive resonator during operation of the wireless power transfer system, and wherein the metal plate facilitates reducing far-field electromagnetic emissions and improving cooling of the wireless power transfer system.

In yet another aspect, a transmit resonator for use in a wireless power transfer system is provided. The transmit resonator includes a core defining an annular groove, a coil element disposed within the annular groove, and a housing surrounding the core and the coil element, the housing made of a thermally conductive material to facilitate improving thermal performance of the wireless power transfer system.

In yet another aspect, a wireless power transfer system is provided. The wireless power transfer system includes a receive resonator, and a transmit resonator including a core defining an annular groove, a coil element disposed within the annular groove, and a housing surrounding the core and the coil element, the housing made of a thermally conductive material to facilitate improving thermal performance of the wireless power transfer system.

DETAILED DESCRIPTION OF THE DISCLOSURE

The present disclosure is directed to a transmit resonator for use in a wireless power transfer system. The transmit resonator includes a core defining an annular groove, a coil element disposed within the annular groove, and a housing surrounding the core and the coil element. The housing includes a casing. and a metal plate, wherein the metal plate is positioned on a side of the transmit resonator that is opposite a receive resonator during operation of the wireless power transfer system, and wherein the metal plate facilitates reducing far-field electromagnetic emissions and improving cooling of the wireless power transfer system.

Figure 1:
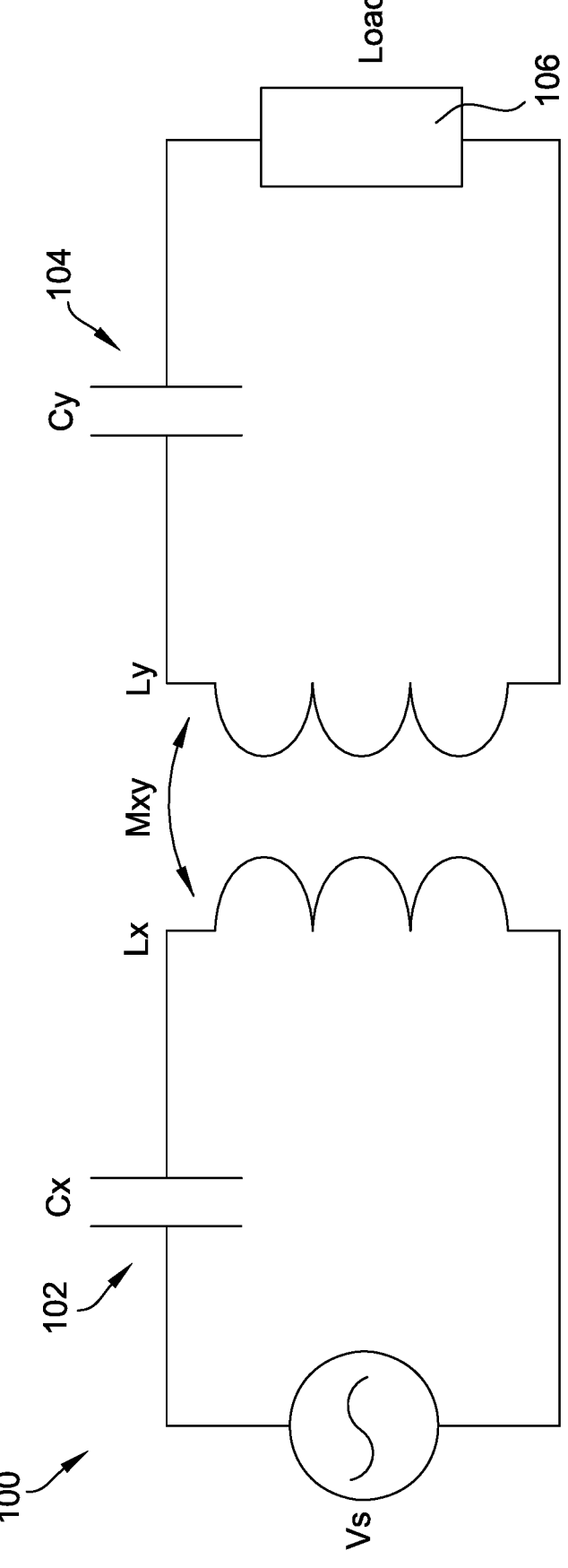
FIG. 1 is a simplified electrical circuit diagram of one embodiment of a wireless power transfer system.

Referring now to the drawings, FIG. 1 is a simplified circuit of an exemplary wireless power transfer system 100.

The system 100 includes an external transmit resonator 102 and an implantable receive resonator 104. In the system shown in FIG. 1, a power source Vs is electrically connected with the transmit resonator 102, providing power to the transmit resonator 102. The receive resonator 104 is connected to a load 106 (e.g., an implantable medical device). The receive resonator 104 and the load 106 may be electrically connected with a switching or rectifying device (not shown).

In the exemplary embodiment, the transmit resonator 102 includes a coil Lx connected to the power source Vs by a capacitor Cx. Further, the receive resonator 104 includes a coil Ly connected to the load 106 by a capacitor Cy. Inductors Lx and Ly are coupled by a coupling coefficient k. $M_{xy}$ is the mutual inductance between the two coils. The mutual inductance, $M_{xy}$, is related to the coupling coefficient k as shown in the below Equation (1).

$$M_{xy} = k\sqrt{L_x \cdot L_y} \qquad (1)$$

In operation, the transmit resonator 102 transmits wireless power received from the power source Vs. The receive resonator 104 receives the power wirelessly transmitted by the transmit resonator 102, and transmits the received power to the load 106.

Figure 2:
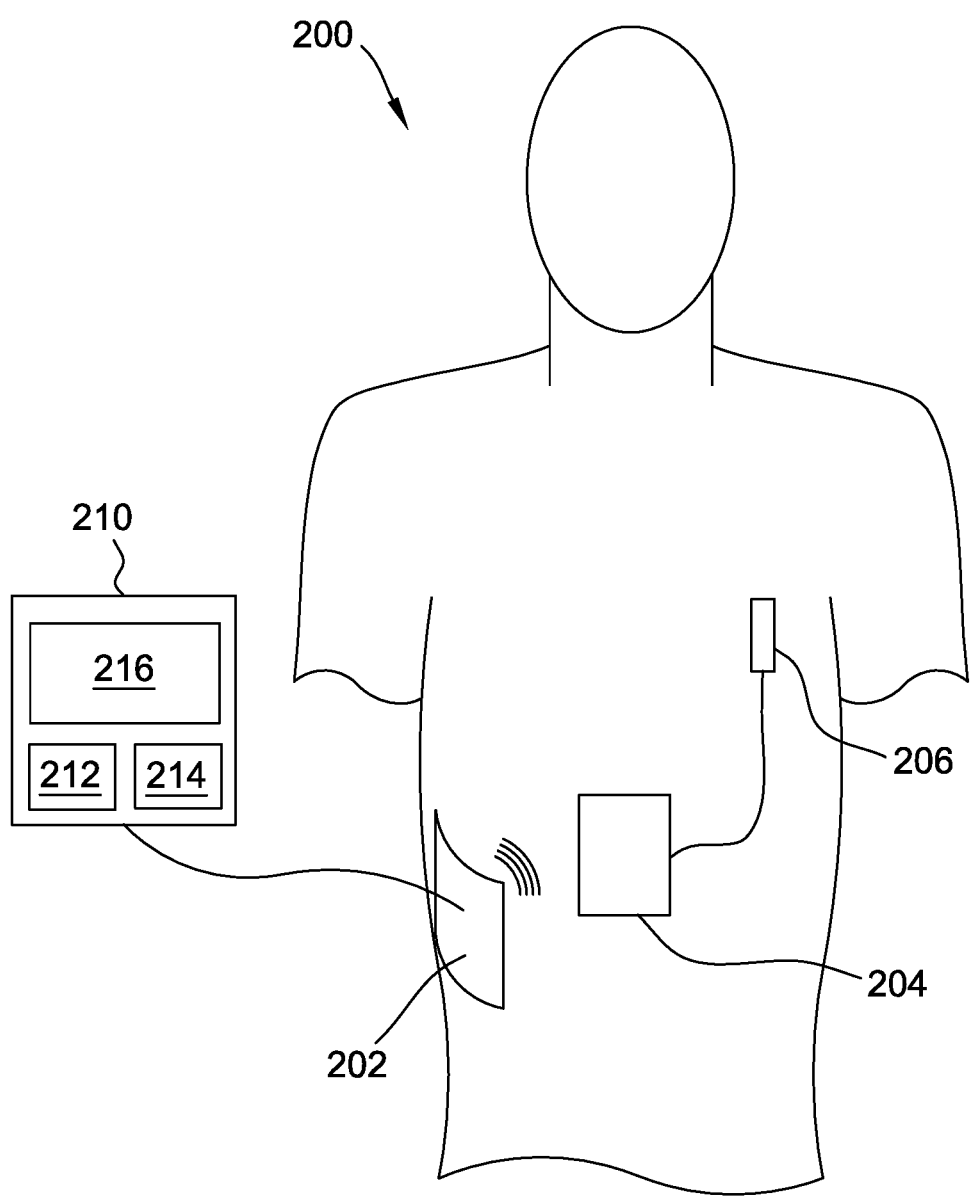
FIG. 2 is an illustration of the wireless power transfer system of FIG. 1 being used to supply power to a ventricular assist device (VAD).

FIG. 2 illustrates one embodiment of a patient 200 using an external coil 202 (such as the transmit resonator 102 shown in FIG. 1) to wirelessly transmit power to an implanted coil 204 (such as the receive resonator shown in FIG. 1). The implanted coil 204 uses the received power to power an implanted device 206. For example, the implanted device 206 may include a pacemaker or heart pump (e.g., a left ventricular assist device (LVAD)). In some embodiments, the implanted coil 204 and/or the implanted device 206 may include or be coupled to a battery.

In one embodiment, the external coil 202 is communicatively coupled to a computing device 210, for example, via wired or wireless connection, such that the external coil 202 may receive signals from and transmit signals to the computing device 210. In some embodiments, the computing device 210 is a power source for the external coil 202. In other embodiments, the external coil 202 is coupled to an alternative power supply (not shown). The computing device 210 includes a processor 212 in communication with a memory 214. In some embodiments, executable instructions are stored in the memory 214.

The computing device 210 further includes a user interface (UI) 216. The UI 216 presents information to a user (e.g., the patient 200). For example, the UI 216 may include a display adapter (not shown) that may be coupled to a display device, such as a cathode ray tube (CRT), a liquid crystal display (LCD), an organic LED (OLED) display, and/or an "electronic ink" display. In some embodiments, the UI 216 includes one or more display devices. Further, in some embodiments, presentation interface may not generate visual content, but may be limited to generating audible and/or computer-generated spoken-word content. In the example embodiment, the UI 216 displays one or more representations designed to aid the patient 200 in placing the external coil 202 such that the coupling between the external coil 202 and the implanted coil 204 is optimal. In some embodiments, the computing device 210 may be a wearable device. For example, in one embodiment, the computing device 210 is a wrist watch, and the UI 216 is displayed on the wrist watch.

Figure 3:
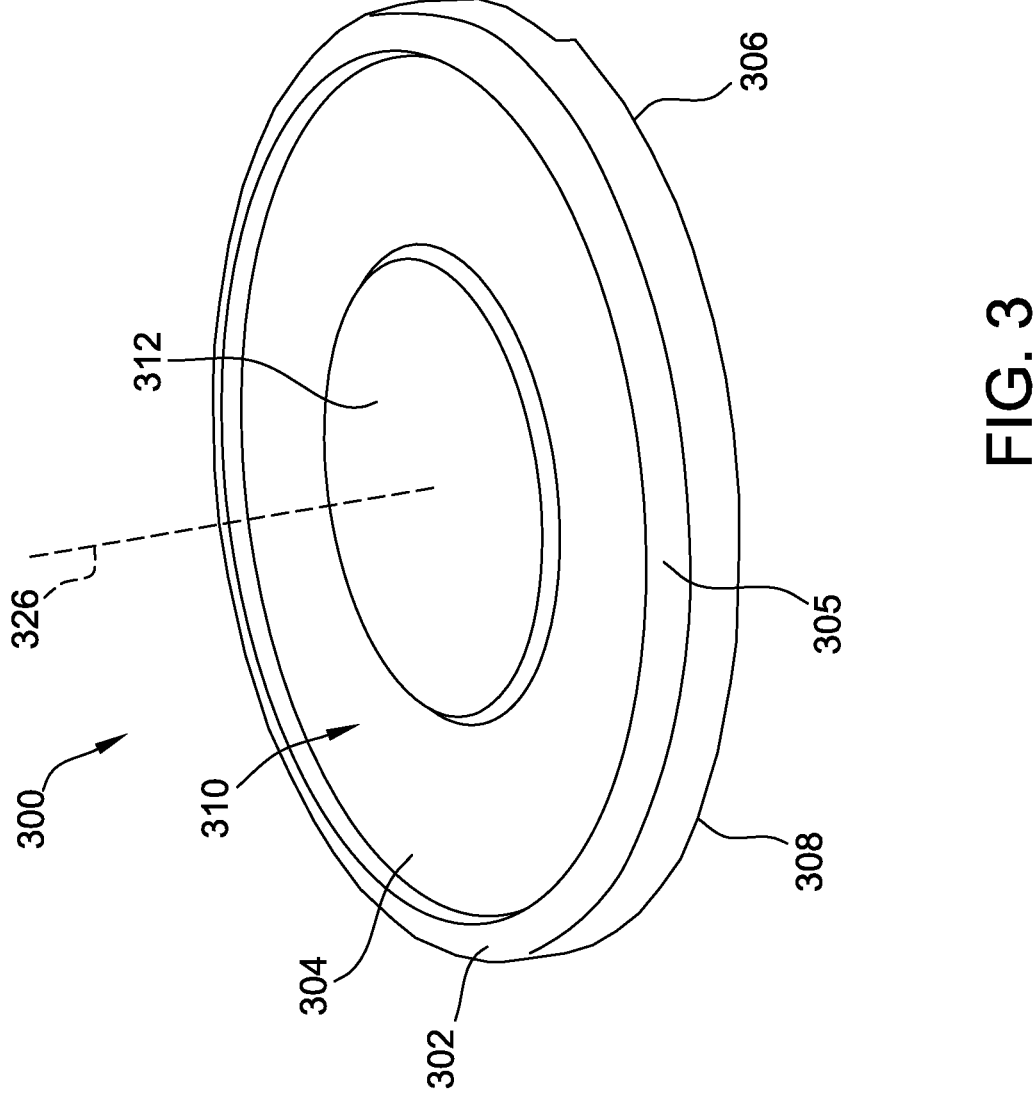
FIG. 3 is a front perspective view of one embodiment of a resonator that may be used to implement the system shown in FIG. 1.

FIG. 3 is a front perspective view of one embodiment of a resonator 300 that may be used to implement the system 100 shown in FIG. 1. For example, the resonator 300 may be used to implement the external transmit resonator 102, the implantable receive resonator 104, the external coil 202, and/or the implanted coil 204.

As shown in FIG. 3, the resonator 300 includes a core 302 and a coil element 304. The core 302 includes a front surface 305, a back surface 306, and an annular sidewall 308 extending between the front surface 305 and the back surface 306. An annular groove 310 is defined in the front surface 305, forming a central post 312 of the core 302.

The resonator 300 (including the core 302 and the coil element 304) functions as a wireless power resonator when coupled to a capacitor (e.g., a capacitor on a printed circuit board electrically coupled to the coil element 304). However, those of skill in the art will appreciate that the resonator 300, without connection to a capacitor, constitutes a coil assembly. Accordingly, as used herein, the term "resonator" does not require that the device be coupled to a capacitor to form a wireless power resonator. In contrast, as used herein, the term "resonator" is broad enough to cover a coil assembly that includes a core and a coil element without connection to a capacitor, as shown in FIG. 3.

The core 302 is formed of a magnetic material, and may, for example, be formed of a ferrite material, such as nickel-based or manganese-based ferrites. Nickel-based ferrites generally have lower electrical conductivity and reduced losses, while manganese-based ferrites have a higher magnetic permeability (while still having acceptable losses), facilitating containing magnetic field lines, and reducing fringing fields entering nearby conductors (e.g., a titanium enclosure or copper in a nearby PCB) to prevent losses. In other embodiments, other types of ferrite materials may be used. For example, in some embodiments, a magnesium-based ferrite (e.g., MgCuZn, which may outperform nickel-based and manganese-based ferrites in a frequency range around 1 Megahertz (MHz)) may be used.

In the embodiment shown, the coil element 304 is positioned within the annular groove 310 and surrounds the central post 312. The resonator 300 may be, for example, a Litz wire resonator or a stacked plate resonator. In a Litz wire resonator, the coil element 304 includes a plurality of loops of Litz wire. In a stacked plate resonator, the coil element 304 includes a plurality of stacked plates that may include a plurality of alternating dielectric layers and conductive layers arranged in a stack. The dielectric layers may be formed of, for example, ceramic, plastic, glass, and/or mica.

The coil element 304 is electrically coupled to, for example, a power source (when functioning as a transmit resonator) or the load 106 (when functioning as a receive resonator). In operation, when power is supplied to the resonator 300 operating as a transmit resonator, current flows through the coil element 304, creating an inductive current loop. This inductive current loop is capable of wirelessly transmitting power to a second resonator 300, provided that resonance frequencies of the first and second resonators 300 overlap. In the embodiment shown, the coil element 304 includes a plurality of terminals 314 that extend through the core to the rear surface 306. The terminals 314 facilitate electrically coupling the coil element 304 to a power supply or load, as appropriate.

Figure 4:
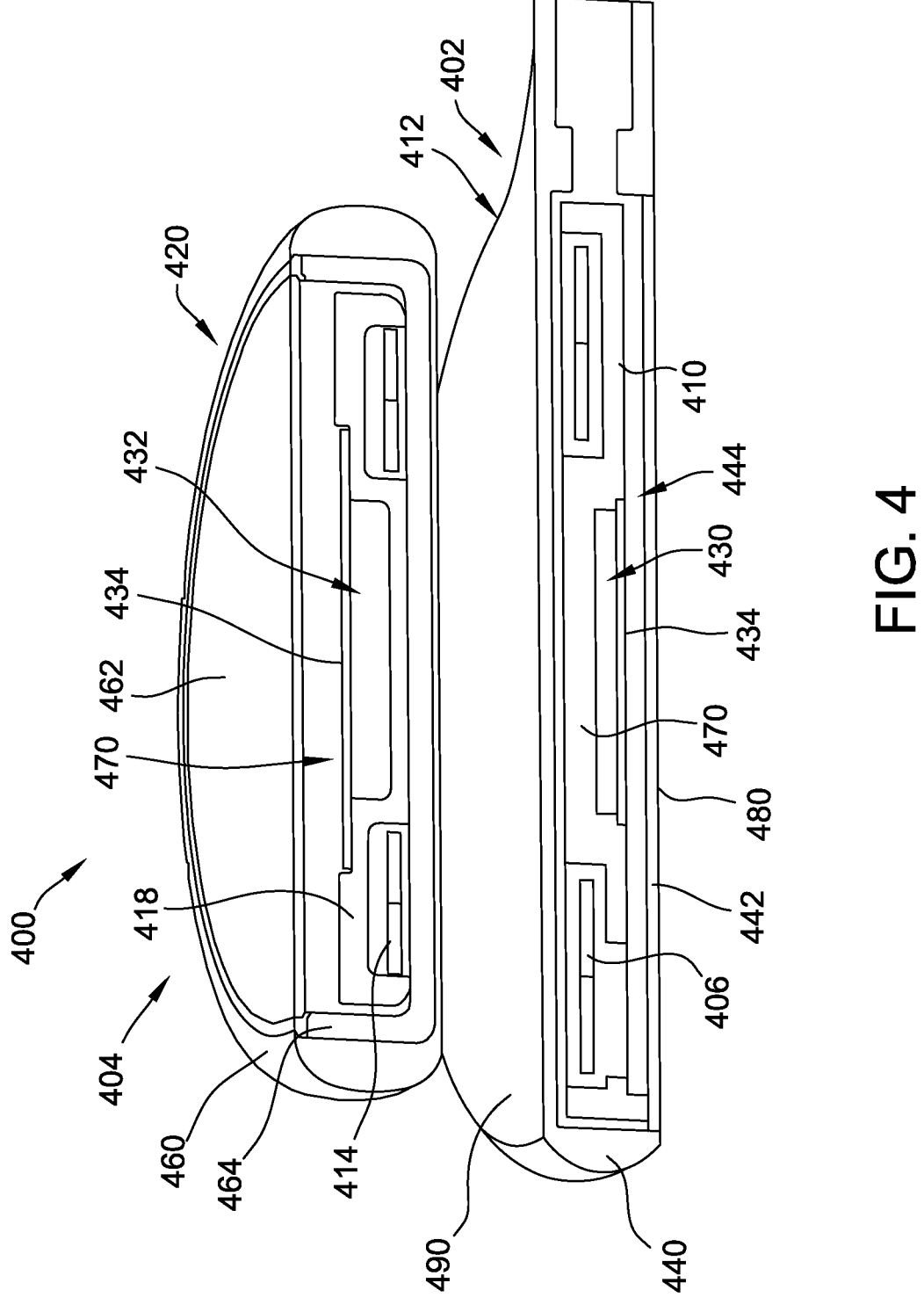
FIG. 4 is a perspective cross-sectional view of one embodiment of a wireless power transfer system including a transmit resonator and a receive resonator.

FIG. 4 is a perspective cross-sectional view of a wireless power transfer system 400 including a transmit resonator 402 and a receive resonator 404. The transmit and receive resonators 402 and 404 may each be implemented, for example, using the resonator 300 (shown in FIG. 3). As shown in FIG. 4, the transmit resonator 402 includes a first coil element 406 and a first core 410 positioned within a first housing 412. Similarly, the receive resonator 404 includes a second coil element 414 and a second core 418 positioned within a second housing 420. As explained above, the receive resonator 404 is typically implanted within the body, while the transmit resonator 402 is typically external to the body.

In the embodiment shown, the first and second coil elements 406 and 414 are embedded within a filler material (e.g., polyester polyurethane). Further, in the embodiment shown, the first core 410 and the second core 418 define a first cavity 430 and a second cavity 432, respectively. The cavities 430 and 432 may be used to store one or more electronic components (not shown) and may be each covered with a laminate layer 434 (e.g., FR4).

As shown in FIG. 4, the first housing 412 substantially surrounds the first coil element 406 and the first core 410. Further, in this embodiment, the first housing 412 is formed by a first casing 440 and a first plate 442, as described in more detail below. In this embodiment, the first casing 440 is fabricated from a polymer, such as, for example, high density poly ethylene (HDPE). Further, as shown in FIG. 4, a gap 444 is defined between at least some portions of the first housing 412 and the first core 410.

Similarly, the second housing 420 substantially surrounds the second coil element 414 and the second core 418. The second housing 420 is formed by a second casing 460 and a second plate 462. Further, in this embodiment, an inner shell 464 separates the second casing 460 from the second core 418. The second casing 460 may be fabricated from, for example, polyether ether ketone (PEEK), the second plate 462 may be fabricated from, for example, titanium, and the inner shell 464 may be fabricated from, for example, zirconia. Alternatively, the second casing 460, the second plate 462, and the inner shell 464 may be fabricated from any suitable material. As shown in FIG. 4, a gap 470 is defined between at least some portions of the second housing 420 and the second core 418. The gap 470 may contain a gas (e.g., helium and/or argon).

In the embodiment shown, the first plate 442 is a metal plate (e.g., an aluminum plate, an aluminum alloy plate, a copper plate, a silver plate, etc.). Further, as shown in FIG. 4, the first plate 442 is located on a side 480 of the transmit resonator 402 that is opposite the receive resonator 404 (i.e., the side 480 that faces away from the receive resonator 404). That is, the first plate 442 forms a portion of the first housing 412 that faces away from the transmit resonator 402. In this embodiment, the first plate 442 is highly electrically conductive, and forms substantially the entirety of the side 480.

Notably, the composition and arrangement of the first plate 442 facilitates reducing far-field EM emissions from the wireless power transfer system 400, and causes temperatures across the exterior of the transmit resonator 402 to be more uniform, improving cooling. As used herein, far-field EM emissions refer to EM emissions at a distance from the first coil element 406 that is greater than an outer diameter of the first core 410 (including distances several times larger than the outer diameter of the first core 410).

More specifically, during operation of the wireless power transfer system 400, induced image currents in the first plate 442 will partially cancel out far-field magnetic field effects. Further, because electrically conductive materials also tend to be thermally conductive, the first plate 442 also functions as a heat spreader, making the temperatures across the exterior of the transmit resonator 402 more uniform. This improves the overall cooling of the transmit resonator 402 and facilitates reducing hot spots on the exterior.

Figure 5B:
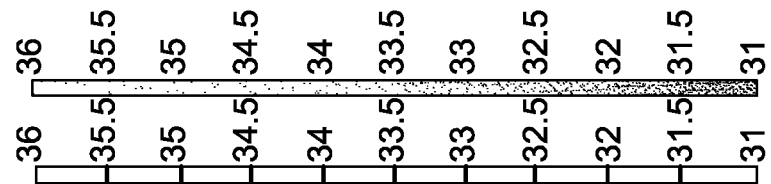
FIG. 5B is a diagram illustrating a thermal profile of a side of a transmit resonator that faces away from a receive resonator.
Figure 5B:
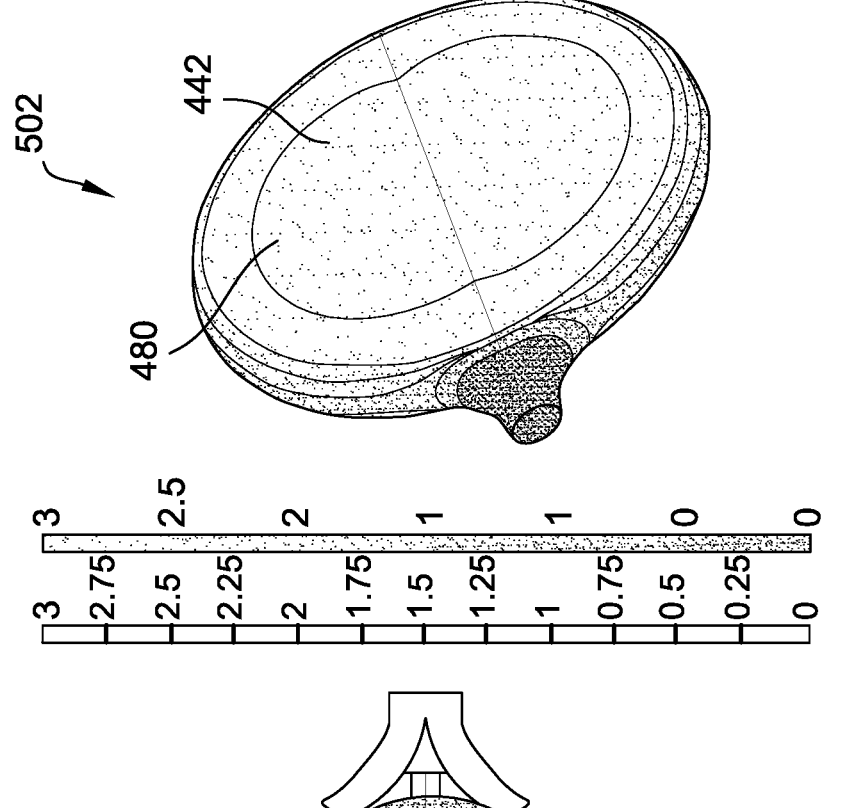
Figure 5A:
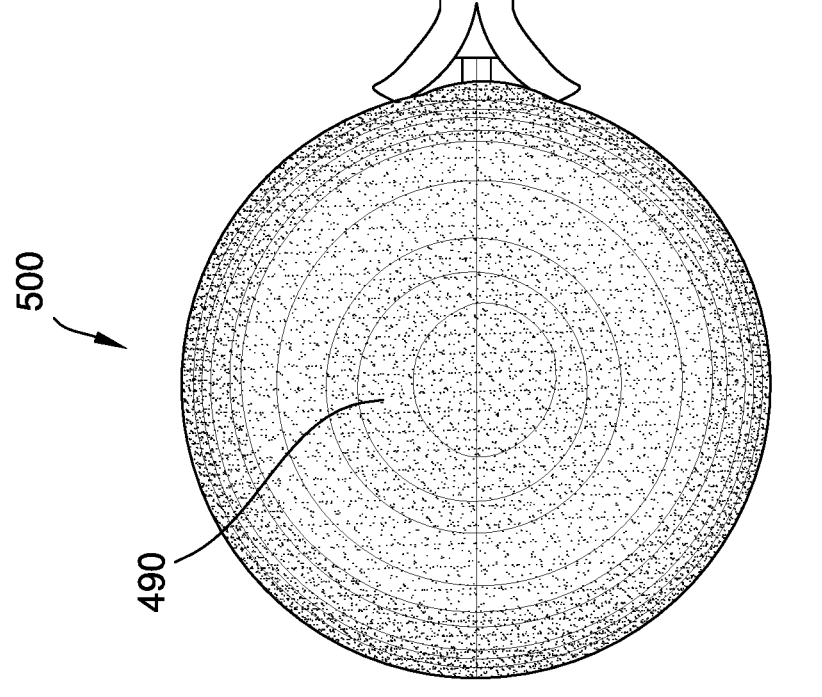
FIG. 5A is a diagram illustrating a thermal profile of a side of a transmit resonator that faces a receive resonator.

For example, FIG. 5A is a diagram 500 illustrating a thermal profile of a side 490 of the transmit resonator 490 that faces the receive resonator 404 (i.e., the side 490 is opposite the side 480). The side 490 is the side of the transmit resonator 490 that would generally contact a patient's skin during operation. FIG. 5B is a diagram 502 illustrating a thermal profile of the side 480 including the first plate 442. As shown by FIG. 5A and FIG. 5B, the side 480 with the first plate 442 has a much more uniform temperature profile, and no hot spots exist. Accordingly, cooling takes place across the entire side 480, resulting in more effective cooling.

To verify the advantages of first plate 442, a transmit resonator without a metal plate (such as the first plate 442) was experimentally compared with a transmit resonator with a metal plate. Notably, when including the metal plate, far-field EM emissions were reduced by approximately 35%. Further, increasing the diameter of the metal plate further reduced far-field EM emissions (up to approximately 43%).

Referring back to FIG. 4, in the wireless power transfer system 400, the design and configuration of the transmit resonator 402 may impact thermal performance of the receiver resonator 404. Generally, the design strategy for the receive resonator 404 should be different than that of the transmit resonator 402.

For example, in one embodiment, the receive resonator 404 may include a combination of high and low thermal conductivity materials to steer heat away from biological tissue that generally gets the hottest during operation of the wireless power transfer system 400 (e.g., the tissue between the transmit resonator 402 and the receive resonator 404).

On the other hand, to improve thermal performance, the transmit resonator 402 may be made as thermally conductive as possible. This facilitates allowing heat to escape from the hottest biological tissue. To accomplish this, the first housing 412 (which contacts the patient) may be made of a thermally conductive material, such as a high-purity aluminum ceramic, zirconia, and/or a polymer composite with boron nitride nanosheets.

Accordingly, in some embodiments, the first housing 412 is a heat-conducting housing with a relatively high thermal conductivity (but without being an electrical conductor, such as metal, in order to avoid interfering with operation of the wireless power transfer system 400). This provides several thermal advantages.

For example, making the entire portion of the transmit resonator 402 that contacts the patient thermally conductive results in conducting heat away from the underlying biological tissue. Further, making the rest of the transmit resonator 402 thermally conductive causes heat to be carried away from the patient and subsequently spread across the surface of the side 480, improving cooling.

Figure 6A:
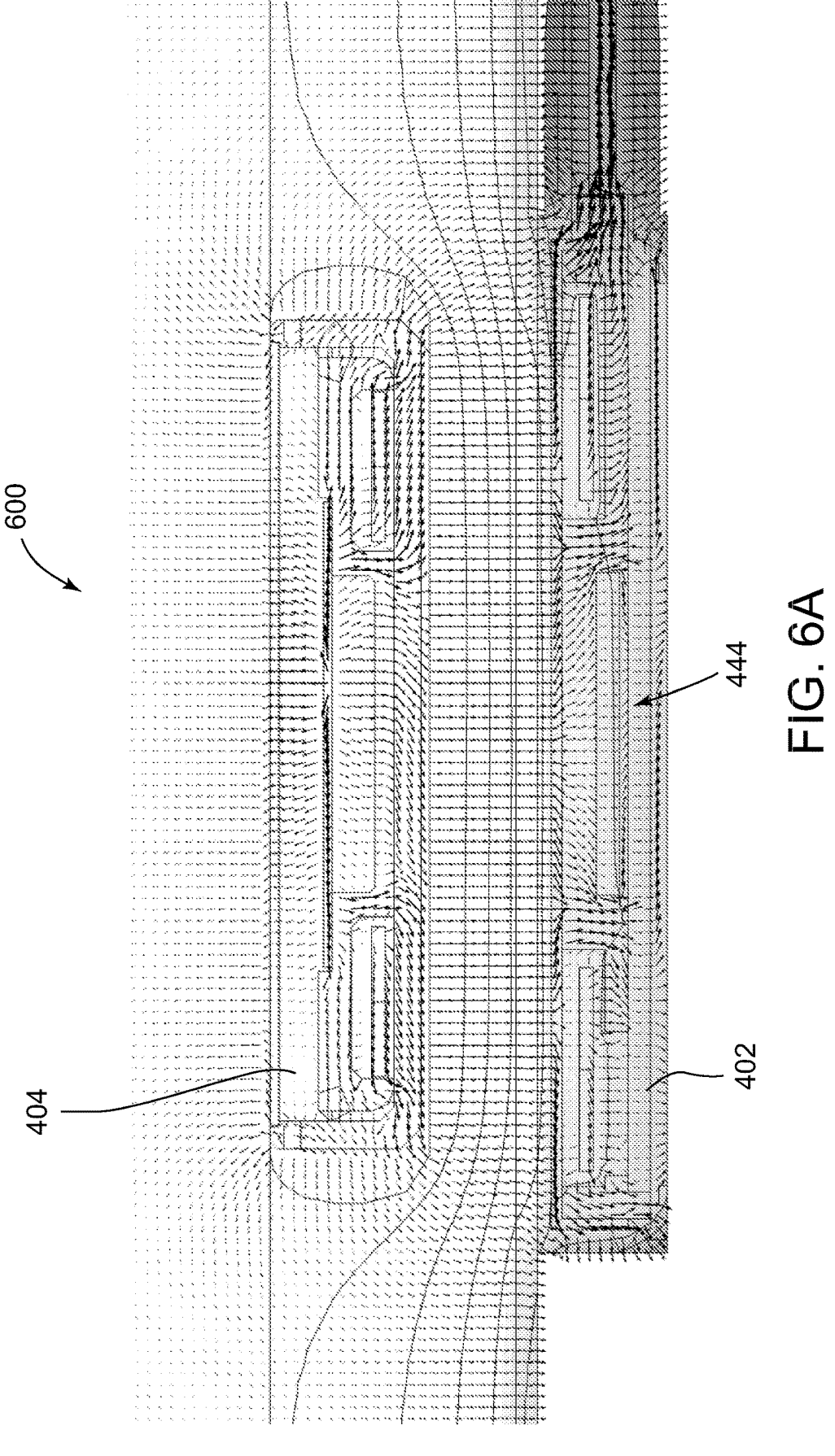
FIG. 6A is a thermal diagram of a wireless power transfer system with a gap filled with thermally conductive alumina.
Figure 6B:
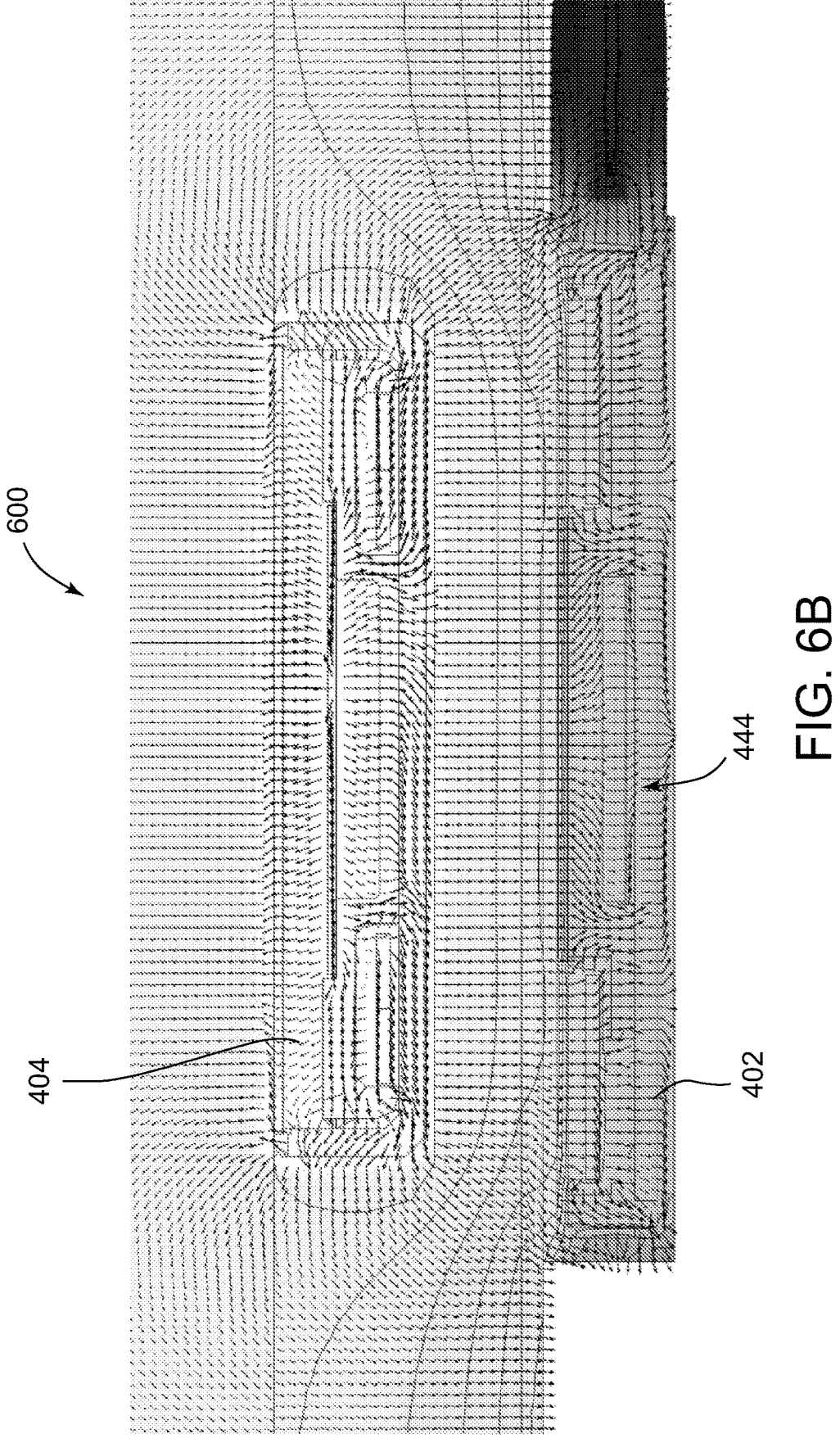
FIG. 6B is a thermal diagram of a wireless power transfer system with a gap filled with thermally insulating foam.

Further, placing different materials in the gap 444 of the transmit resonator 402 may further improve thermal performance. For example, FIG. 6A is a thermal diagram 600 of the wireless power transfer system 400 with the gap 444 filled with thermally conductive alumina. In contrast, FIG. 6B is a thermal diagram 602 of the wireless power transfer system 400 with the gap 444 filled with thermally insulating foam (e.g., a polyurethane or polystyrene based foam). The arrows in the diagrams 600 and 602 indicate the direction and magnitude of the heat flow. As shown in the diagrams 600 and 602, more heat is carried away from the hot center of the transmit resonator when the alumina is used.

For example, during experimentation, it was found that, when the first housing 412 was plastic (e.g., PEEK), a maximum temperature rise on the surface of the receive resonator 404 was 2.81 degrees Celsius with foam in the gap 444, but only 2.39 degrees Celsius with alumina in the gap 444.

In another example, the plastic housing was replaced with thermally conductive alumina. Here, the maximum temperature rise on the surface of the receive resonator 404 was reduced from 2.42 degrees Celsius to 2.22 degrees Celsius. Notably, any reduction in temperature rise on the receive resonator 404 is beneficial.

The embodiments described herein are directed to a transmit resonator for use in a wireless power transfer system. The transmit resonator includes a core defining an annular groove, a coil element disposed within the annular groove, and a housing surrounding the core and the coil element. The housing includes a casing. and a metal plate, wherein the metal plate is positioned on a side of the transmit resonator that is opposite a receive resonator during operation of the wireless power transfer system, and wherein the metal plate facilitates reducing far-field electromagnetic emissions and improving cooling of the wireless power transfer system.

Although the embodiments and examples disclosed herein have been described with reference to particular embodiments, it is to be understood that these embodiments and examples are merely illustrative of the principles and applications of the present disclosure. It is therefore to be understood that numerous modifications can be made to the illustrative embodiments and examples and that other arrangements can be devised without departing from the spirit and scope of the present disclosure as defined by the claims. Thus, it is intended that the present application cover the modifications and variations of these embodiments and their equivalents.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transmit resonator for use in a wireless power transfer system for supplying power to an implantable medical device, the transmit resonator comprising:
a core defining an annular groove;
a coil element disposed within the annular groove; and
a housing surrounding the core and the coil element, the housing comprising:
a casing; and
a metal plate, wherein the metal plate is positioned on a side of the transmit resonator that is opposite a receive resonator during operation of the wireless power transfer system, and wherein the metal plate facilitates reducing far-field electromagnetic emissions and improving cooling of the wireless power transfer system, wherein the metal plate forms a side of the housing.

2. The transmit resonator of claim 1, wherein the metal plate is an aluminum plate.

8

3. The transmit resonator of claim 1, wherein the metal plate is an aluminum alloy plate.

4. The transmit resonator of claim 1, wherein the casing is plastic.

5. The transmit resonator of claim 1, wherein the casing is a thermally conductive material.

6. A wireless power transfer system for supplying power to an implantable medical device comprising:
a receive resonator; and
a transmit resonator comprising:
a core defining an annular groove;
a coil element disposed within the annular groove; and
a housing surrounding the core and the coil element, the housing comprising:
a casing; and
a metal plate, wherein the metal plate is positioned on a side of the transmit resonator that is opposite a receive resonator during operation of the wireless power transfer system, and wherein the metal plate facilitates reducing far-field electromagnetic emissions and improving cooling of the wireless power transfer system, wherein the metal plate forms a side of the housing.

7. The wireless power transfer system of claim 6, wherein the metal plate is an aluminum plate.

8. The wireless power transfer system of claim 6, wherein the metal plate is an aluminum alloy plate.

9. The wireless power transfer system of claim 6, wherein the casing is plastic.

10. The wireless power transfer system of claim 6, wherein the casing is a thermally conductive material.

11. A transmit resonator for use in a wireless power transfer system for supplying power to an implantable medical device, the transmit resonator comprising:
a core defining an annular groove;
a coil element disposed within the annular groove; and
a housing surrounding the core and the coil element, the housing made of a thermally conductive material to facilitate improving thermal performance of the wireless power transfer system, wherein the housing comprises a metal plate, the metal plate forming a side of the housing; wherein a gap is defined between the housing and the core, and wherein the gap is filled with a thermally conductive gap material.

12. The transmit resonator of claim 11, wherein the thermally conductive material is a high-purity aluminum ceramic.

13. The transmit resonator of claim 11, wherein the thermally conductive gap material is alumina.

14. The transmit resonator of claim 11, and wherein the metal plate is positioned on a side of the transmit resonator that is opposite a receive resonator during operation of the wireless power transfer system.

15. A wireless power transfer system for supplying power to an implantable medical device comprising:
a receive resonator; and
a transmit resonator comprising:
a core defining an annular groove;
a coil element disposed within the annular groove; and
a housing surrounding the core and the coil element, the housing made of a thermally conductive material to facilitate improving thermal performance of the wireless power transfer system, wherein the housing comprises a metal plate, the metal plate forming a side of the housing; wherein a gap is defined between the housing and the core, and wherein the gap is filled with a thermally conductive gap material.

16. The wireless power transfer system of claim 15, wherein the thermally conductive material is a high-purity aluminum ceramic.

17. The wireless power transfer system of claim 15, wherein the thermally conductive gap material is alumina.

18. The wireless power transfer system of claim 15, wherein the metal plate is positioned on a side of the transmit resonator that is opposite a receive resonator during operation of the wireless power transfer system.

\* \* \* \* \*